United States Patent [19]
Skirde

[11] Patent Number: 6,129,169
[45] Date of Patent: Oct. 10, 2000

[54] MOBILE WORK VEHICLE WITH COMPACT AXLE ASSEMBLY

[75] Inventor: Eckhard Skirde, Aukrug-Böken, Germany

[73] Assignee: Sauer Inc., Ames, Iowa

[21] Appl. No.: 09/092,448

[22] Filed: Jun. 5, 1998

[51] Int. Cl.[7] .................................................. B60K 17/00
[52] U.S. Cl. ............................ 180/305; 180/307; 91/498
[58] Field of Search .................................. 180/305, 307; 91/491, 194, 196, 198; 415/209; 60/696

[56] References Cited

U.S. PATENT DOCUMENTS

| | | | |
|---|---|---|---|
| 2,101,730 | 12/1937 | Benedek | 91/496 |
| 3,283,668 | 11/1966 | Louhio | 91/498 X |
| 3,468,390 | 9/1969 | Schultz | 180/305 X |
| 3,661,057 | 5/1972 | Rogov | 91/498 X |
| 3,760,690 | 9/1973 | Freeman | 91/491 X |
| 3,824,899 | 7/1974 | Dzioba | 180/305 X |
| 3,961,558 | 6/1976 | Dokukin et al. | 91/491 X |
| 3,969,950 | 7/1976 | Rau et al. | 180/305 X |
| 4,128,048 | 12/1978 | Nishiba | 91/491 |
| 4,132,154 | 1/1979 | Nishiba | 91/491 |
| 4,478,132 | 10/1984 | Braddock | 91/491 X |
| 4,505,185 | 3/1985 | Jacobs | 91/491 |
| 4,686,829 | 8/1987 | Thoma et al. | |
| 4,843,818 | 7/1989 | Thoma et al. | 91/498 X |
| 4,974,496 | 12/1990 | Apgar | 91/491 |
| 5,115,890 | 5/1992 | Noel | 91/491 X |
| 5,357,843 | 10/1994 | Errante | 91/491 |
| 5,473,894 | 12/1995 | Bigo et al. | 91/498 X |
| 5,647,249 | 7/1997 | Okada et al. | 180/305 X |
| 5,655,417 | 8/1997 | Okada et al. | 180/305 X |
| 5,664,465 | 9/1997 | Okada et al. | 180/305 X |
| 5,694,816 | 12/1997 | Okada et al. | 180/305 X |
| 5,697,765 | 12/1997 | Grahl | 91/491 |
| 5,768,955 | 6/1998 | Hauser | 180/305 X |

*Primary Examiner*—Lanna Mai
*Attorney, Agent, or Firm*—Zarley, McKee, Thomte, Voorhees & Sease

[57] ABSTRACT

A mobile work vehicle with at least one driven axle assembly is connected to and driven by just one integrated hydraulic motor. The hydraulic motor is a low-speed radial-piston motor which has a hollow shaft of which the axis of rotation is concentric with respect to the longitudinal axis of the axle assembly.

5 Claims, 3 Drawing Sheets

MOBILE WORK VEHICLE WITH COMPACT AXLE ASSEMBLY

BACKGROUND OF THE INVENTION

It is old to equip a rigid front axle for industrial forklift trucks with just a single hydraulic motor. The hydraulic motor in such cases is fitted on the outside of the front axle in the region between the respective axle-centering flanges, the hydraulic motor being a high-speed hydraulic motor. The axis of rotation of the high-speed hydraulic motor is thus arranged axially parallel to the longitudinal axis of the front axle. Such an axle does not meet the requirements for high compactness, since the hydraulic motor externally flange-mounted on it requires not only additional transmission elements, (e.g., transmission gear mechanisms, from the hydraulic motor to the respective axle stubs) but also a relatively large installation space.

Also known are axle assemblies into which two hydraulic motors are integrated to power a driven wheel. Although such axle assemblies with two integrated hydraulic motors have greater compactness than axle assemblies with an externally mounted high-speed hydraulic motor with respect to the outer dimensions, the twin hydraulic motors to be provided make these axle assemblies relatively expensive and therefore also complicated in their construction.

DE 43 11 997 A1 describes a hydraulic motor which is provided with a hollow shaft. This known hydraulic unit has reduced system-dependent axial force components and, as a unit, is provided with a mounting which takes up little installation space. Such a low-speed radial-piston motor typically has speeds of up to 300 rpm and delivers adequate torque for a wheel drive of a mobile vehicle, without a further transmission being required, if each wheel has its own drive. Neither a differential nor its arrangement inside an axial assembly are described.

DE 33 07 047 A1 describes a unit which comprises an axial-piston motor and epicyclic gearing in the form of a bevel-gear differential mechanism, the differential mechanism being arranged inside the axial-piston motor, which is of the swash-plate type of design. A spatially favorable arrangement and undemanding requirements for installation space are achieved by arranging a differential directly inside an axial-piston motor. In comparison with the radial-piston motors, the radial dimensions of the axial-piston motors are much smaller. This makes it possible to provide a unit which meets the requirement for a small installation space, in which unit the differential is surrounded directly and completely by an axial-piston motor. Also described is the use of a radial-piston motor and provision of the differential inside it. However, this leads to very large dimensions of the axle assembly and consequently not a compact construction. The arrangement of a differential within the motor of the known unit together with the endeavor to achieve a compact construction have the result, however, that the differential cannot transfer in the given space the torque which is to be transferred.

Consequently two possibilities for designing the axle assembly of a mobile work vehicle are known in the prior art. According to the first possibility, the drive motor is arranged outside the longitudinal axis of the axle assembly, it being possible for the differential to be integrated in the axle assembly. The disadvantage of such an arrangement is a relatively large radial dimension, which is at odds with the requirement for high compactness. The second possibility for the drive is to arrange the motor within the axle and to integrate the differential in the motor, i.e. the drive motor completely surrounds the differential. The disadvantage is, on the one hand, that for large torque to be transferred by the differential likewise large radial dimensions are required and, on the other hand, with smaller radial dimensions large required torque cannot be transferred.

The invention is therefore based on the object of providing a mobile work vehicle with a minimized number of hydraulic-motor drives with high torque transmission, the driven axle assemblies of which have a compact construction. The advantages of low-speed radial-piston motors is that they do not require any mechanical transmission, but nevertheless permit the vehicle to travel around bends without the drive wheels slipping.

These and other objects of the invention will be apparent to those skilled in the art.

SUMMARY OF THE INVENTION

A mobile work vehicle according to the invention has at least one driven axle assembly. A mobile work vehicle is to be understood as meaning in particular forklift trucks, wheeled loaders, telehandlers or telescopic stackers, mobile excavators or the like. The driven axle assembly is driven by just one hydraulic motor integrated therein. According to the invention, the hydraulic motor is a low-speed radial-piston motor which has a hollow shaft of which the axis of rotation coincides with the longitudinal axis of the axle assembly, i.e. is arranged concentrically with respect to the latter.

Such an arrangement of the radial-piston motor with hollow shaft in the axle assembly, which itself is provided with a hollow axle housing, has the effect that on the one hand only one hydraulic motor is required for an axle assembly. On the other hand the use of a low-speed radial-piston motor makes it possible to dispense with the interposing of transmission gear mechanisms which are otherwise required in the case of high-speed hydraulic motors. Therefore, the direct wheel drive can take place via the interior of the axle housing of the axle assembly, with the result that an axle assembly which is compact overall is created. From the differential there leads a first drive shaft to a first drive wheel on a first side of the vehicle. A second drive shaft is on a second side of the vehicle opposite to the first side, for connection to a second drive wheel.

The hollow shaft of the radial-piston motor is directly connected to the cage of a differential. The differential is arranged in the interior of the axle housing of the axle assembly. The direct connection of the hollow shaft of the radial-piston motor to the cage of the differential dispenses with the need for the large bevel gear/spur gear or the bevel-gear/spur-gear stage in the differential found in customary arrangements. The invention also increases the compactness of the axle assembly with respect to the bevel-gear/spur-gear stage generally requiring a relatively large installation volume in the case of conventional assemblies.

Inside the axle housing of the axle assembly one output end of the differential is connected via the hollow shaft of the radial-piston motor to the first drive wheel on the first side of the vehicle. Here the first output shaft is led from the differential through the entire hollow shaft. The other output end of the differential is connected to the second wheel on the vehicle side which lies opposite the first vehicle side. The second output shaft lies outside the hollow shaft. The drive energy is supplied to the respective wheels from the hydraulic motor by the differential via the output shafts.

For a compact design of the axle assembly of the mobile work vehicle according to the invention, the radial-piston motor is therefore designed in such a way that it provides the wheels with the complete torque required, even high torque, without a corresponding reduction gearing being provided. To be able to transfer high torque, a differential of a certain minimum dimensioning is likewise required. The differential is arranged in the direction of the axis of rotation on one side of the radial-piston motor. As a result, high compactness can be accomplished in the radial direction. In the case of such a lateral arrangement of the differential on the radial-piston motor, the radial dimensions of the radial-piston motor can therefore be reduced or kept relatively small, since the output shaft is led from the differential completely through the hollow shaft of the radial-piston motor. The differential, which is designed with a larger diameter in comparison with the output shaft, which is led through the hollow shaft of the radial-piston motor, can therefore be dimensioned sturdily enough for the torque to be transferred, without disadvantageously influencing the radial dimension of the radial-piston motor.

In this connection, the torque that is required to be transferred is obtained from the product of the swept volume and pressure of the hydraulic motor and the reduction of a following gear mechanism. If only a slow-speed radial-piston motor is provided as the drive motor, it is possible to dispense with a reduction gear mechanism between the drive motor and the wheel of the vehicle. The advantages of the radial-piston motor can be optimally utilized only if the radial-piston motor is designed as small as possible in its radial dimensions and can nevertheless transfer high torque.

The differential serves merely to compensate for different wheel speeds when the work vehicle is traveling around bends. It does not require any separate reduction gearing. Therefore, the design of the cage of the differential is chosen such that a simple, low-cost connection of the cage to the hollow shaft is ensured, in that the cage is connected directly to the hollow shaft. At the same time, however, it is also made possible for an output shaft to be led completely through the hollow shaft of the radial-piston motor.

To make the mobile work vehicle more flexible in its use, the differential is of a lockable design.

To increase the compactness of the axle assembly further, a single brake is arranged directly on the radial-piston motor. The brake, the braking action of which is released by means of a corresponding known brake-release device, is arranged between the hollow shaft of the radial-piston motor and the axle housing. It is also possible, however, that each wheel is assigned a separate brake in the form of a conventional drum brake or disc brake. These brakes, assigned to the respective wheels, can be arranged between the frame securement of the axle assembly to the vehicle and the centering device for the drive wheels.

According to another embodiment, the radial-piston motor is designed as a motor with balanced forces and has at least one bearing for guiding the hollow shaft. The shaft of the radial-piston motor is secured directly to the cage of the differential by means of suitable screw connections. Preferably, however, the radial-piston motor has a bearing for guiding the hollow shaft on each side facing the respective wheels.

According to another embodiment, the radial-piston motor is integrated in a closed hydraulic circuit.

In order that no oil losses occur in the event of an excessive supply of hydraulic oil, the radial-piston motor has a leakage oil line connected to an oil tank.

The mobile work vehicle has an axle assembly of high compactness. The low-speed radial-piston motor is integrated into the axle assembly in such a way that the axis of the hollow shaft of the radial-piston motor coincides with the longitudinal axis of the axle assembly. Furthermore, the low-speed radial-piston motor makes it possible to dispense with transmission gear mechanisms otherwise required, whereby high compactness of the axle assembly is likewise achievable. Since the axle assembly is designed as a hollow component provided with an axle housing, the differential, which is required for driving the two wheels secured to the respective axle assembly, is arranged inside the axle housing. A direct connection of the hollow shaft of the radial-piston motor to the cage of the differential dispenses with the need for the otherwise required first stage of a conventional differential. This first stage generally requires relatively large installation dimensions and stands in the way of increasing the compactness of the axle assembly. The use of a low-speed radial-piston motor with hollow shaft inside the axle assembly makes it possible to lead the output shafts from the differential through the radial-piston motor to one wheel of the driven axle assembly, and from the other output end of the differential to the other driven wheel of the axle assembly.

DESCRIPTION OF THE PREFERRED EMBODIMENT

Figure 1:
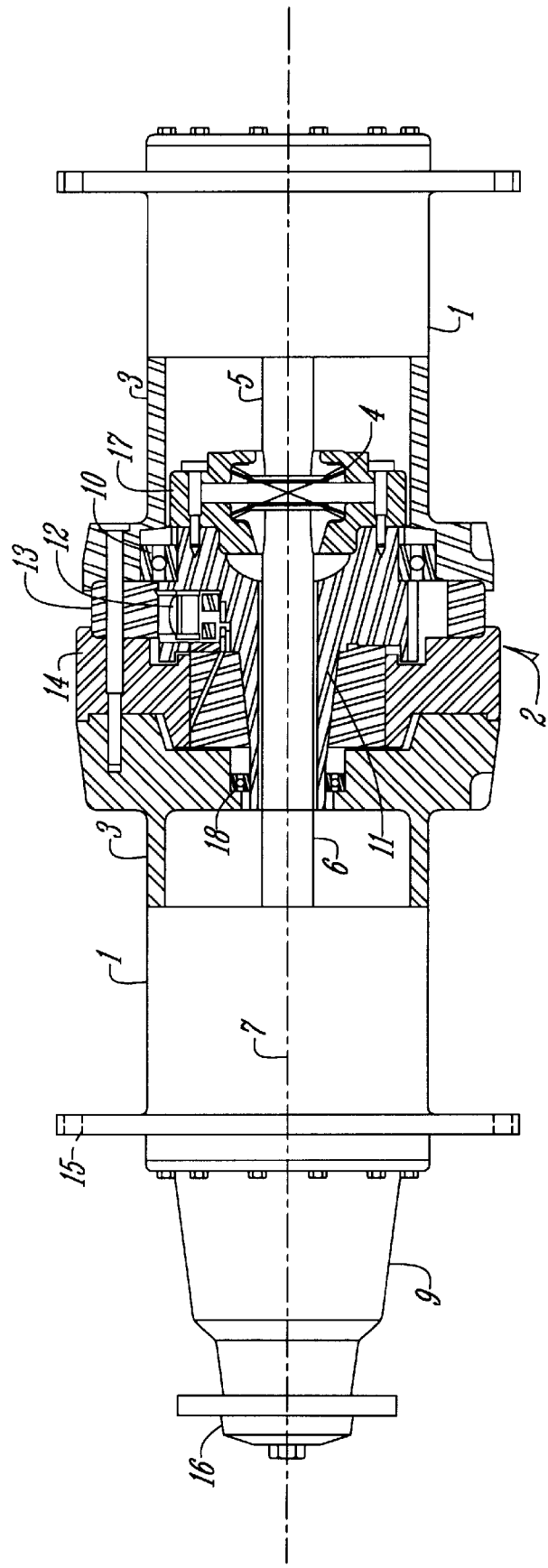
FIG. 1 is a partial sectional view of an axle assembly for a mobile work vehicle according to a first embodiment of the invention.

In FIG. 1, an axle assembly 1 for a mobile work vehicle according to a first embodiment of the invention is shown in a basic representation. The axle assembly 1 has a low-speed radial-piston motor 2, which is provided with a hollow shaft 11. The axis of rotation of the hollow shaft 11 coincides with the longitudinal axis 7 of the axle assembly 1. Connected on each side of the radial-piston motor 2 is a hollow axle assembly 3, which establishes the connection between the radial-piston motor 2 and the respective frame securement 15 of the vehicle. A differential 4 is arranged on one side of the radial-piston motor 2, inside the axle housing 3, and is directly connected by means of screws to the hollow shaft 11 of the radial-piston motor 2. The differential 4 is surrounded by a cage 17, this cage 17 of the differential 4 being connected to the hollow shaft 11 of the radial-piston motor 2. Each output end of the differential 4 is connected to an output shaft 5, 6.

The right-hand output shaft 5, represented in FIG. 1, leads from the differential 4, arranged on the right alongside the radial-piston motor 2, via the frame securement 15 to the centering means 16 (not shown on the right-hand side in FIG. 1) for the drive wheel on the right (not shown) and is directly connected to the latter.

The output shaft 6 opposite the output shaft 5 of the differential 4 is led in an analogous way, to the left in FIG. 1, from the differential 4 through the hollow shaft 11 of the radial-piston motor 2, through the frame securement 15 and through the centering means 16 for the left-hand output wheel to the latter.

The output shaft 6 is in this case led from the differential 4 through the entire hollow shaft 11 of the radial-piston motor 2 to the wheel (not shown) provided on the left in FIG.

1. By contrast, the output shaft 5 is led from the differential 4 through the hollow axle housing 3 to the wheel (likewise not shown) provided on the right in FIG. 1. The output shaft 5 consequently lies entirely outside the hollow shaft 11 of the radial-piston motor 2. The lateral arrangement of the differential with a direct connection of the cage 17 of the differential 4 to the hollow shaft 11 of the radial-piston motor 2 therefore allows the radial dimension of the radial-piston motor 2 to be reduced. This is because the diameter of the hollow shaft only has to be slightly larger than the diameter of the output shaft 6. The diameter of the differential 4, on the other hand, may be made such that the latter fits without any problem into the hollow axle housing 3, with the result that the differential 4 can be designed for the transfer of great torque. In addition, the hollow shaft 11 of the radial-piston motor 2 may be dimensioned only with respect to the forces occurring in the radial-piston motor. The direct connection of the cage 17 of the differential 4 to the hollow shaft 11 of the radial-piston motor 2 also increases the rigidity of the drive unit integrated into the axle assembly, while not significantly exceeding the outside diameter of the axle housing 3. Consequently, a high compactness not previously known in the prior art is accomplished by the axle assembly according to the invention.

The arrangement of the differential 4 inside the axle housing 3 dispenses with the need for the set of bevel gears or set of spur gears customarily used as a drive for the differential 4, with the result that the entire axle assembly 1 is of a very compact design in the radial direction with respect to its longitudinal axis 7.

The radial-piston motor 1 has an external cam ring 13, an internal piston 12, running on the cam ring 13, and a corresponding distributor 14 for supplying the hydraulic fluid to the cylinders. On each side of the radial-piston motor 2 facing the drive wheels there is provided between the hollow shaft 11 and the part of the respective axle housing 3 designed as the housing part a bearing 10 or 18, respectively, for guiding the hollow shaft 11 of the radial-piston motor 2.

When the axle assembly 1 is used for a wheeled loader, for example, it is possible to disconnect one of two driven axles by means of the freewheeling function with which the radial-piston motors 2 are always provided and consequently to increase the final speed of the vehicle for a given pump delivery rate. The radial-piston motors 2 may also be designed in the form of motors with a swept volume which can be changed over.

The frame securement 15 of the vehicle on each side of the axle assembly 1 and also the mounting of the output shafts 5, 6 on the drive wheels are dimensioned in a conventional way known to correspond to the external forces to be expected. It is also possible for a multiple-disc brake to be used as the brake.

DESCRIPTION OF A SECOND EMBODIMENT

Figure 2:
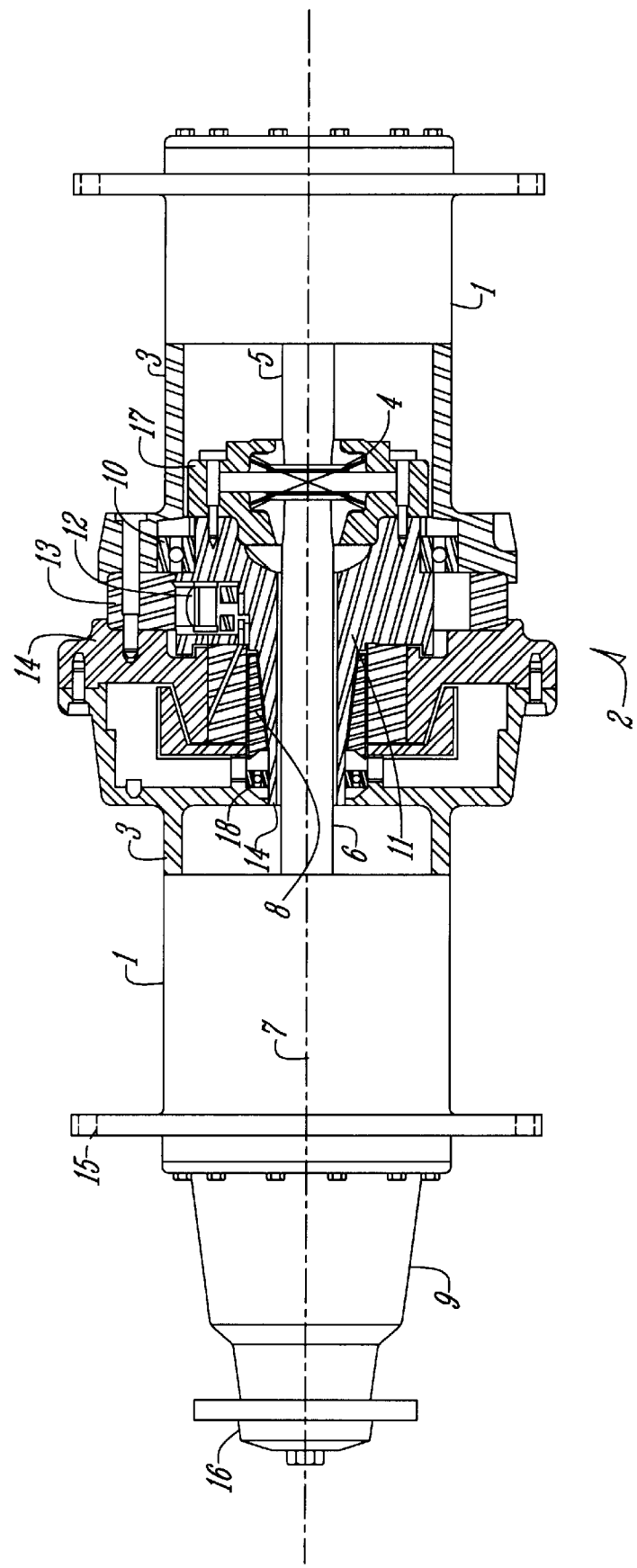
FIG. 2 is a view similar to FIG. 1 but shows a basic structure a second embodiment, with a brake.

Represented in FIG. 2 is the basic structure according to FIG. 1 corresponding to a second embodiment of this invention. This basic structure of the axle assembly 1 is similar to that according to FIG. 1, the difference being that a brake 8 is additionally arranged on the radial-piston motor 2. The arrangement of a single brake 8 directly on the radial-piston motor 2 has the effect of further increasing the compactness of the axle assembly 1, since it is possible to dispense with individual brakes assigned to each drive wheel. As can be seen from FIG. 2, the brake 8 arranged directly on the radial-piston motor 2 is arranged between the hollow shaft 11 of the radial-piston motor 2 and the axle housing 3. As a result, the braking action may be supplied by the differential 4 equally via the respective output shafts 5, 6 on the right and on the left to the respective drive wheels.

Figure 3:
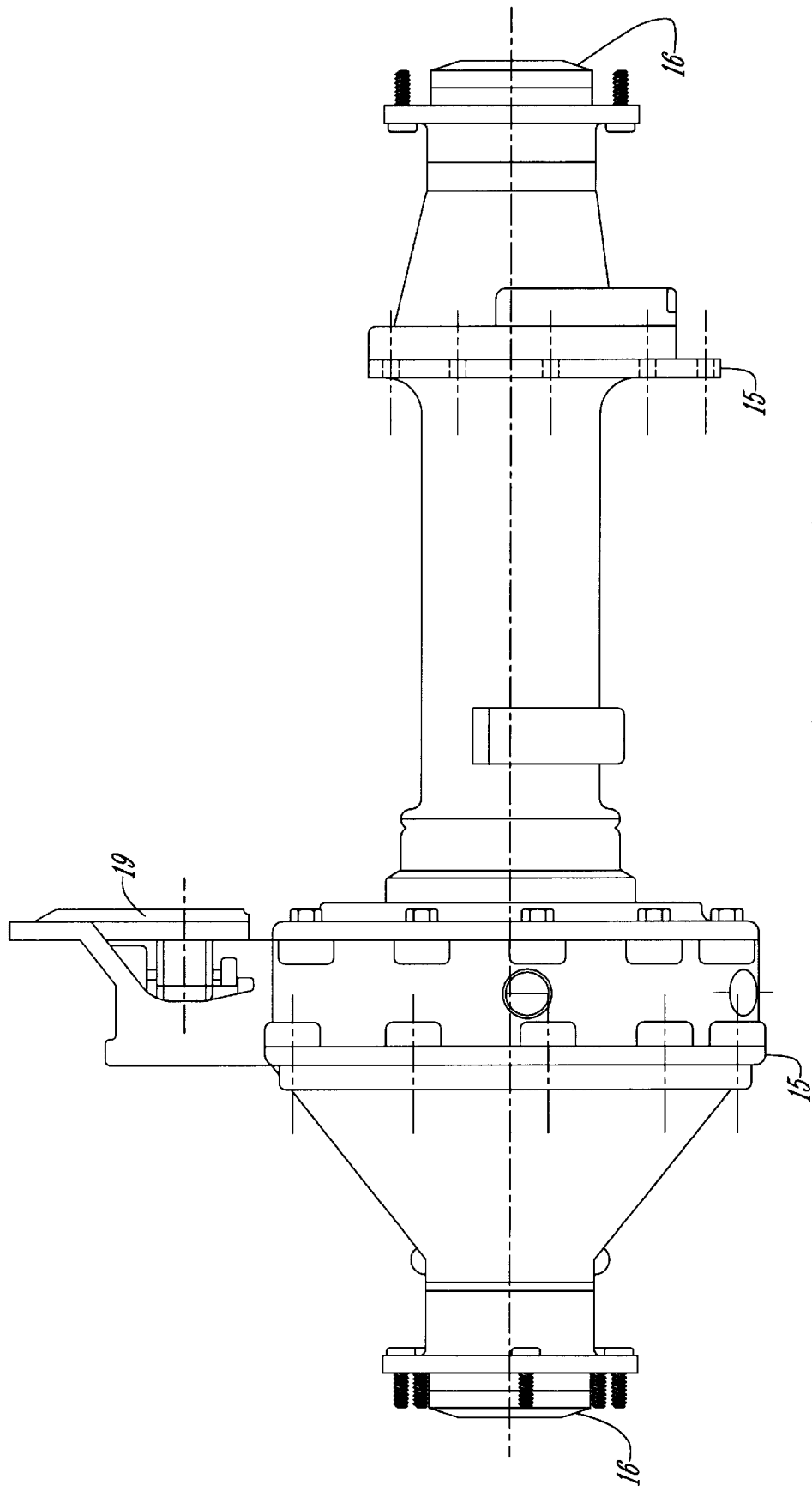
FIG. 3 shows the front axle of a forklift truck with a drive motor mounted on the side, according to the prior art.

Shown in FIG. 3 in a basic representation is the structure of an axle assembly for a mobile work vehicle according to the prior art. This axle assembly likewise has just one hydraulic motor 19 for driving both drive wheels on each side of the axle assembly. By contrast with the present invention, in the case of the axle assembly according to the prior art, however, the hydraulic motor 19 is arranged to the side of the longitudinal axis of the axle assembly, with the result that the axis of rotation of the hydraulic motor is arranged parallel to the longitudinal axis of the axle assembly and not concentrically with respect to it. As a result, an increased installation space is required. Since, moreover, a high-speed hydraulic motor 19 is used, transmission gear mechanisms have to be provided inside the axle assembly, with the result that the radial dimensions of the assembly according to the prior art are relatively large.

From the foregoing, it is seen that this invention will accomplish at least all of its stated objectives.

I claim:

1. A mobile work vehicle comprising:

at least one driven axle assembly (1) having a longitudinal axis of rotation;

the axle assembly (1) has integrated thereinto just one hydraulic motor, the hydraulic motor being a low-speed, high-torque radial-piston motor (2) which has a rotatable hollow shaft (11) having an axis of rotation which is concentric with respect to the longitudinal axis of rotation (7) of the axle assembly (1);

the hollow shaft (11) of the radial-piston motor (2) being connected to the cage (17) of a differential (4); and the differential includes two opposite output ends, one of the output ends of the differential (4) being connected by the hollow shaft (11) of the radial-piston motor (2) to a first drive wheel and the other of the output ends of the differential (4) being connected to a second drive wheel.

2. The mobile work vehicle according to claim 1, characterized in that a brake (8) is arranged on the radial-piston motor (2).

3. The mobile work vehicle according to claim 2, characterized in that the radial-piston motor (2) has a leakage oil line and an actuating device for the brake (8).

4. The mobile work vehicle according to claim 1, characterized in that the radial-piston motor (2) has balanced forces and is provided with at least one bearing (10) for guiding the hollow shaft (11), the hollow shaft (11) of the radial-piston motor (2) being secured directly to the cage (17) of the differential (4).

5. The mobile work vehicle according to claim 1, characterized in that the radial-piston motor (2) is integrated in a closed hydraulic circuit.

* * * * *